Dec. 2, 1924.

A. G. IONIDES 1,518,070

CLUTCH MECHANISM

Filed Dec. 20, 1922   3 Sheets-Sheet 3

INVENTOR

Alexander George Ionides,

BY Watson, Coit, Morse & Grindle

ATTYS.

Patented Dec. 2, 1924.

1,518,070

UNITED STATES PATENT OFFICE.

ALEXANDER GEORGE IONIDES, OF LEICESTER, ENGLAND, ASSIGNOR OF ONE-HALF TO VAUXHALL MOTORS LIMITED, OF BEDFORDSHIRE, ENGLAND, A COMPANY OF GREAT BRITAIN.

CLUTCH MECHANISM.

Application filed December 20, 1922. Serial No. 608,095.

*To all whom it may concern:*

Be it known that I, ALEXANDER GEORGE IONIDES, a subject of the King of England, residing in Leicester, in England, have invented certain new and useful Improvements in Clutch Mechanisms, of which the following is a specification.

This invention relates to friction clutch mechanisms of the type in which the engagement or disengagement of the clutch members is brought about by movement of one of these members in the axial direction by the action of a spring.

In clutch mechanism of this type it has been proposed to provide two springs one of which always tends to engage and the other constantly tends to disengage the clutch members. In this construction the clutch engaging spring is so controlled by a governor that until one of the clutch members reaches or exceeds a predetermined speed, the force exerted by the engaging spring on the movable clutch member is less than that of the disengaging spring so that the clutch remains disengaged, but when the predetermined speed is reached, the engaging spring is compressed by the governor to such an extent that the force exerted by it exceeds that of the disengaging spring and the clutch members engage. A stop is also provided to limit the extent to which the engaging spring can be compressed while a second governor so acts on the clutch member as to disengage the clutch if a certain speed is exceeded. In another form of the same clutch mechanism a ratchet device permits the driven shaft to overrun the clutch.

The object of the invention is to provide an improved mechanism of the above type for use in transmitting the engine drive to the road wheels of motor road vehicles and in particular to vehicles propelled by internal combustion engines.

According to this invention a spring is provided which when operative tends to move one clutch member into and maintain it in engagement with the other clutch member, this spring being so controlled by a governor that unless and until the speed of the driving member reaches or exceeds a predetermined limit, the spring is inoperative on the clutch member. Means are provided for moving the clutch members to effect the engagement or disengagement of the clutch irrespective of the governor controlled spring, and there may be means comprising a quick pitch screw thread on which one of the clutch members is mounted, for automatically disengaging the clutch members if the driven shaft tends to overrun the driving shaft.

In this way a free wheel arrangement is provided which will enable the car to overrun the engine without the clutch pedal or its equivalent being operated and will cause the drive to be taken up smoothly and without shock.

Two alternative constructions according to this invention are illustrated by way of example in the accompanying drawings, in which:—

Like letters indicate like parts throughout the drawings.

Figure 1:
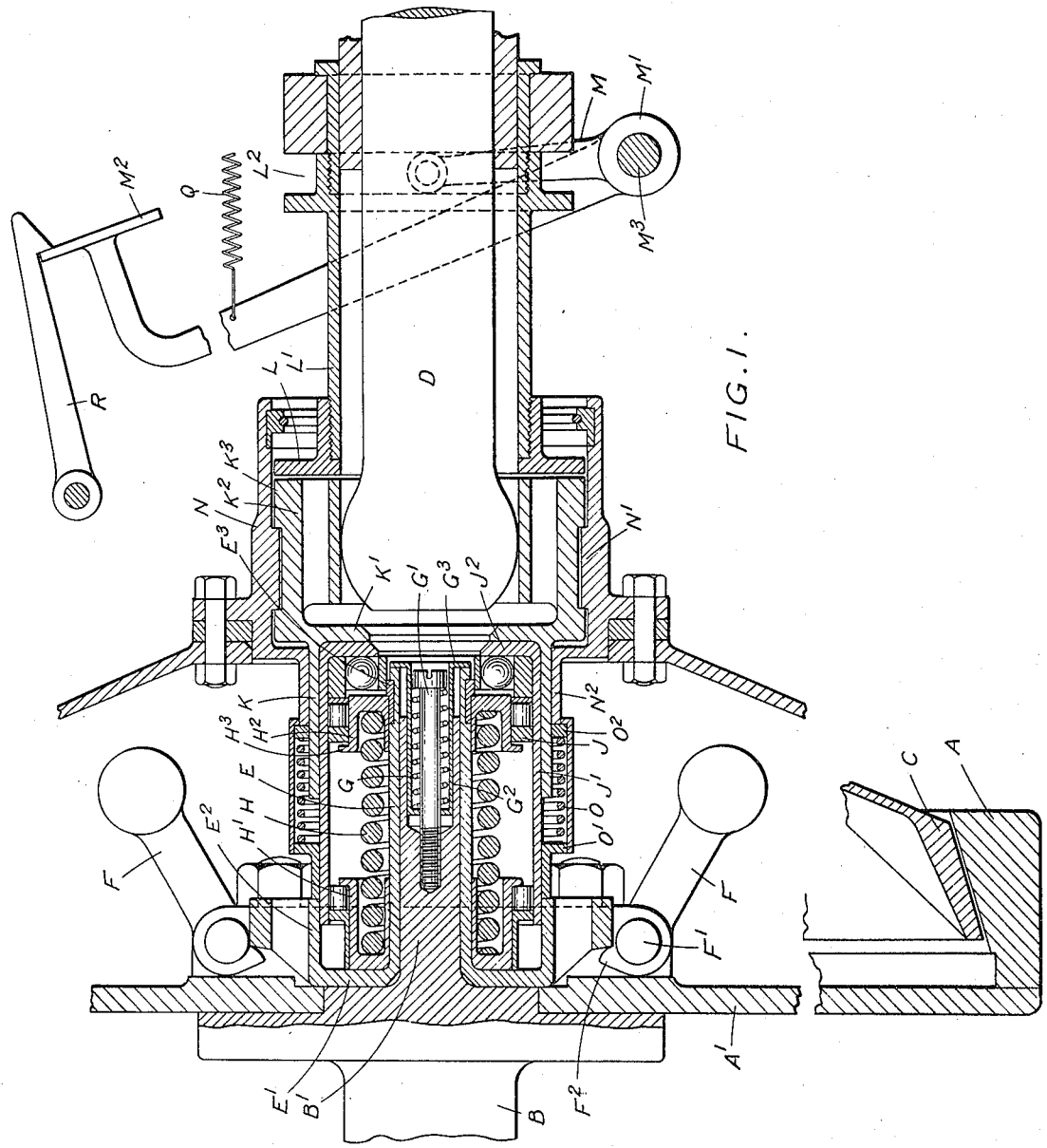
Figure 1 is a longitudinal sectional elevation of one improved clutch mechanism showing the clutch-actuating spring inoperative as when the engine has stopped or is running at low speed.
Figure 2:
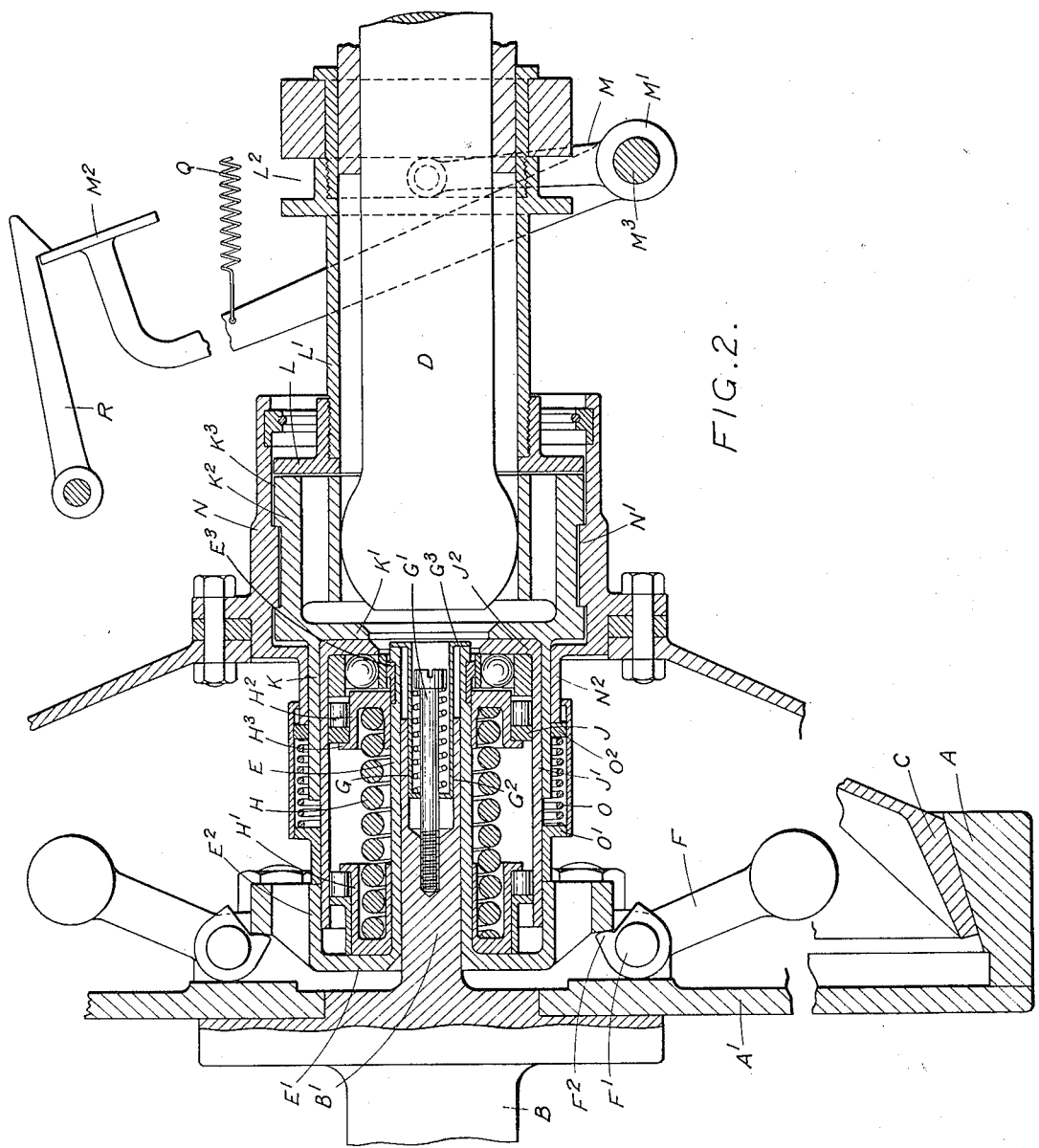
Figure 2 is a similar view of the construction shown in Fig. 1 showing the parts as when the engine has been accelerated and the clutch actuating spring permitted to come into operation.
Figure 3:
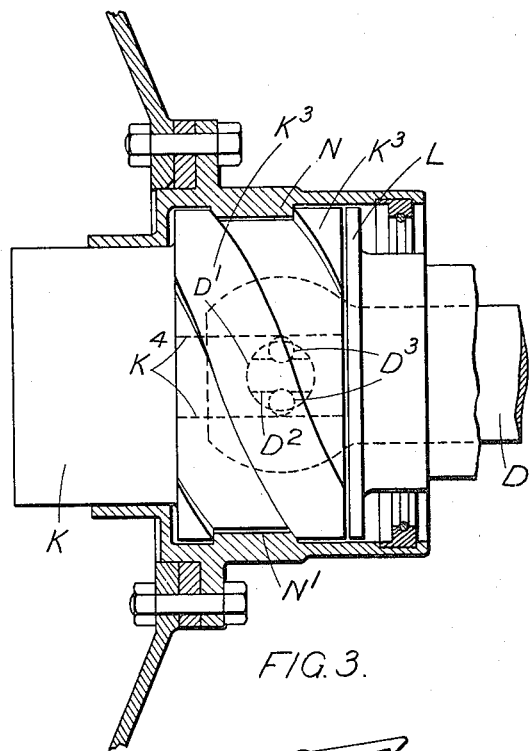
Figure 3 is a longitudinal elevation partly in section of the mechanism employed in the construction shown in Figures 1 and 2 for causing the automatic disengagement of the clutch when the driven shaft tends to overrun the driving shaft.
Figure 4:
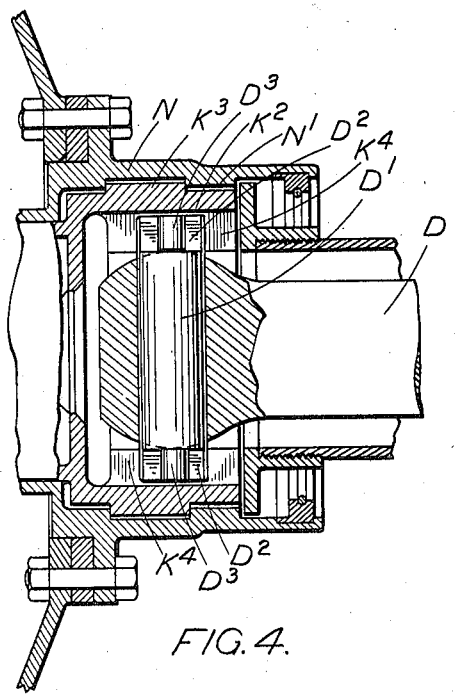
Figure 4 is a longitudinal sectional elevation showing the means for connecting the driven shaft to the driven clutch member.

In the construction shown in Figs. 1 to 4 the outer member A of the cone clutch is shown fixed on the driving or engine shaft B while the inner clutch member C is movably mounted on the driven or transmission shaft D. At the end of the driving shaft B and within the clutch members A and C is a projection B' on which a sleeve E is carried so that it can slide in the axial direction. At the end of the sleeve E adjacent to the main portion of the driving shaft B is a flange E' carrying an annular part $E^2$ which overhangs a portion of the sleeve E. Two or more weighted arms F are pivotally mounted at F' on the disc A' which carries the outer clutch member A, the arms F constituting a governor. Near its pivot F' each arm F is provided with a nose $F^2$ which lies adjacent to and can act on the part $E^2$ of the sleeve E. The arrangement is such that as the speed of rotation of the driving shaft B increases, the weighted arms F will tend to fly out and the noses $F^2$ of these arms will impart movement in the axial direction to the sleeve E. This movement will take place against the action of a coiled spring G disposed within the extension B' of the driving shaft B. One end of this spring abuts against the head of a set screw or bolt G' screwed into the end of the driving shaft while the other end of the spring bears against an internal flange at the inner end of a sliding sleeve or cylinder $G^2$. An external flange $G^3$ at the outer end of the cylinder $G^2$ bears against the end of the sliding sleeve E the spring G thus tending to slide the sleeve E away from the driven shaft D.

Around the sleeve E lies the main clutch spring H which serves to maintain the clutch members A and C in engagement At the forward end this spring H bears against and lies in an annular cup member H' which is carried by the sleeve E and lies within the overhanging part $E^2$ and against the flange E'. The cup member H' thus constitutes a relatively fixed abutment for one end of the spring H. The other and after end of the spring H lies within and bears against an annular cup member $H^2$ but this member can slide on the sleeve E. Movement of the cup member $H^2$ towards the end of the sleeve E is limited by an annular rib $E^3$ formed or mounted on the sleeve E near its end. When the movable abutment member $H^2$ is in contact with the rib or shoulder $E^3$ the spring H is inoperative on the clutch members A and C and is merely held between the two abutment members H' and $H^2$. The sliding abutment member $H^2$ is provided with an external flange $H^3$ which can come into contact with a ring J as soon as the sleeve E has been moved by the action of the governor arms F a short distance in the rearward direction away from the driving shaft B. When this occurs the force of the spring H will be transmitted through the movable abutment member $H^2$ and flange $H^3$ to the ring J since the abutment member $H^2$ will no longer be in contact with the rib $E^3$ on the sleeve E and the parts will be in the respective positions indicated in Figure 2. The spring H will now be operative in the following manner to bring the clutch member C into engagement with the clutch member A.

The ring J is in effect a flange within a sleeve J' which has a flange $J^2$ at one end and suitable bearings are interposed between this sleeve and the abutment member H', the abutment $H^2$ and the end of the sleeve E. The forward end of the sleeve J' lies within the overhanging part $E^2$ of the sleeve E and between this part and the exterior of the abutment member H'. The after end of the sleeve J' lies within a sleeve K which has an internal flange K' against which lies the flange $J^2$. Beyond this flange K' the sleeve K has an extension $K^2$ the end of which lies adjacent to a flange L on one end of a sleeve L' which can slide on the transmission shaft D. The sleeve L' can be caused to slide by acting on the usual clutch pedal for the purpose of disengaging the clutch members. For this purpose the sleeve L' is provided with an annular recess $L^2$ in which lie the ends of forked arms M mounted on a sleeve M' carrying the clutch pedal $M^2$ the sleeve M' being capable of rocking on a shaft $M^3$.

The driven shaft D is connected to the extension $K^2$ of the sleeve K by means of a crosshead D' having flattened ends $D^2$ engaging longitudinal slots $K^4$ in the extension $K^2$, rollers $D^3$ being interposed between the flats on the ends of the crosshead D' and the edges of the slots so as to permit free longitudinal movement of the sleeve K on the shaft D.

On the exterior of the sleeve $K^2$ is formed a broad quick pitch double screw thread $K^3$. The clutch member C is mounted on a sleeve N within which is formed a thread N' corresponding to and engaging the screwthread $K^3$. The sleeve N can thus move in the axial direction to a small extent on the sleeve $K^2$ if these two parts are relatively rotated. The screwthreads $K^3$ N' are arranged so that if the transmission shaft D tends to overrun the driving shaft B, the lag on the clutch member C due to friction with the clutch member A will cause the sleeve N to rotate on the sleeve $K^2$ with the result that the sleeve N will move in the axial direction to an extent sufficient to disengage the clutch member C from the member A. This axial movement of the sleeve N will take place against the action of a coiled spring O which is disposed around the sleeve J' between an abutment ring O' which can slide on the sleeve J' and an abutment ring O² which is slidably mounted on the sleeve K. The abutment ring O² lies at the end of a reduced cylindrical portion N² of the sleeve N which carries the clutch member C.

A spring Q is arranged so as to act directly on the lever of the clutch pedal M² one end of the spring being attached to some fixed part and the other end connected to the pedal lever. A catch R is so arranged as to engage the pedal M² or its lever and prevent it from moving under the influence of the spring Q beyond a predetermined point. The position in which the pedal M² is thus held by the catch R is such that the clutch member C will be barely in contact with the clutch member A but these members will not be engaged to the extent necessary to transmit the drive unless the spring H is permitted by the governor to be operative on the clutch member C. Thus with the pedal M² in this position and held by the catch R no power will be transmitted from the driving shaft B to the transmission shaft D through the clutch members C and A until the speed of rotation of the engine and the shaft B reaches or exceeds the predetermined limit at which owing to the movement of the governor arms F the spring H is permitted to become operative on the clutch member C. If, however, while the engine is running slow with the throttle closed or if the engine has stopped, it is desired to use the engine as a brake on the transmission shaft D or when this shaft is rotating to start up the engine, the catch R can be knocked aside when the spring Q becomes operative through the lever of the pedal M² on the clutch member C and this member will be pulled into such engagement with the clutch member A as to enable rotation to be imparted to the driving shaft B from the transmission shaft D. The spring Q thus overcomes the effect of the movement in the axial direction of the sleeve N on the sleeve K² and acts as a clutch-engaging spring in spite of the spring H being held inoperative by the action of the governor. Under normal running conditions, however, the spring Q will not thus act on the clutch member C as the catch R will constantly be in a position to engage the pedal M² when this is in the running position.

In operation, when the engine is running slowly or has stopped, the action of the spring H on the clutch member C will be inhibited and the clutch member A will rotate without being in frictional engagement with the member C. When, however, the throttle is opened and the engine speeds up, the governor arms F will fly out and the spring abutment ring H² will be moved thereby into a position such that the flange H³ will butt up against the ring J and the pressure of the spring H will then be communicated to the clutch member C. Driving engagement of the clutch members will then take place and they will be maintained in engagement unless and until the speed of the engine drops below the predetermined limit in which case the action of the spring H on the clutch member C will again be inhibited and as a result no drive will be transmitted through the clutch to the transmission shaft D. If while driving through the engaged clutch members A and C either the gradient over which the car is travelling or other conditions should be such as to cause the vehicle to tend to overrun the engine, a free wheeling effect will be obtained since the tendency to drive the engine from the transmission shaft D will cause relative rotation of the sleeve N on the sleeve K² and consequent movement in the axial direction of the sleeve N whereby the clutch members C and A will be automatically disengaged. As soon as the transmission shaft D ceases to overrun the engine, the clutch members will again come into engagement so that the drive can be once more transmitted assuming that the engine speed is sufficient to allow the spring H to be operative. This takes place automatically without any movement of the clutch pedal M² but nevertheless whenever it is desired to disengage the clutch members C and A as during ordinary driving, this disengagement can be effected in the usual manner by movement of the pedal lever.

The details of construction may be modified as found desirable and in accordance with the type of clutch to which the invention is applied and the purpose for which the invention is to be employed. In some cases slight movement in the axial direction of one clutch member which results, as described, when the transmission shaft D overruns the driving shaft B may be imparted to the clutch member A, that is to say, to that member of the clutch which is not normally moved when the two members are to be disengaged. In such circumstances the member C is moved when the clutch is to be disengaged by operation of the clutch pedal lever and it is on this member that the clutch spring H mainly acts. The clutch member A is only permitted the slight movement necessary to effect disengagement of the clutch when overrunning occurs.

Figure 5:
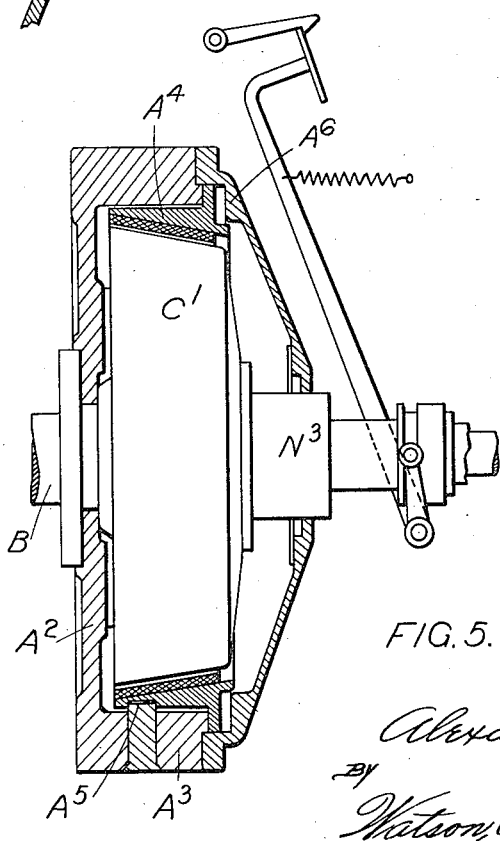
Figure 5 is a longitudinal elevation partly in section of an alternative form of mechanism for causing the disengagement of the clutch when the driven shaft tends to overrun the driving shaft.

One construction of this modified form of clutch is shown in Figure 5. In this construction, the automatic engagement and disengagement of the clutch in accordance with the speed of the driving member is effected in a manner similar to that in which it is effected in the construction illustrated in Figures 1 to 4. Instead of the driven member being moved axially to effect the disengagement of the clutch when the driven member tends to overrun the driving member, however, the driving member is moved axially to effect disengagement of the clutch in this event. To this end, the driving shaft B is connected to a flanged plate $A^2$ within the flanged portion $A^3$ of which is mounted the driving clutch member $A^4$. The flange $A^3$ carries an internal quick pitch screwthread $A^5$ of rectangular cross-section which engages a corresponding external screwthread on the driving clutch member A. The driven clutch member $C'$ is disposed within the driving clutch member $A^4$ but is directly connected to the sleeve K instead of being connected thereto through a screwthread as is the case in the construction shown in Figures 1 to 4. It will be seen that with the construction shown in Figure 5, if the driven shaft D tends to overrun the driving shaft B, the driving clutch member $A^4$ will move longitudinally within the flange $A^3$ by reason of the screwthread $A^5$ so as to disengage the clutch, this movement being limited by a member $A^6$ secured round the edge of the flange $A^3$ and extending inwards to the sleeve $N^3$ carrying the driven clutch member $C'$.

It may be noted that with the present invention the following advantages may be obtained. During the period of clutch engagement it is possible to get a better acceleration than with the normal construction of clutch mechanism, while further, a better acceleration on higher gears at low speeds should be obtainable. A reversal of stress in the propeller shaft at low speeds should not be possible. There should be some economy of fuel due to the frequent automatic disengagement of the clutch members thus giving an advantage when driving in traffic. The mechanism will give increased comfort when driving in traffic and during shunting movements of the vehicle and it should render it possible to use only the top gear when driving in traffic unless the full acceleration of top gear is insufficient to effect the drive.

What I claim as my invention and desire to secure by Letters Patent is:—

1. In a friction clutch mechanism the combination of driving and driven clutch members, a spring which tends to move one clutch member into and maintain it in engagement with the other clutch member, a thrust member which can take the load of the spring, a governor, and means controlled solely by the governor for moving the thrust member so as to transfer the load of the spring to one of the clutch members and thereby cause it to engage with the other clutch member when the speed of the driving clutch member reaches or exceeds a predetermined limit.

2. In a friction clutch mechanism, the combination of driving and driven clutch members, a spring which tends to move one clutch member into and maintain it in engagement with the other clutch member, a thrust member which can take the load of the spring, a stop directly engaging said thrust member, a second spring holding said stop in engagement with said thrust member, and a governor operatively connected to said stop and adapted to cause the stop to move away from the thrust member against the action of the second spring so as to transfer the load of the first spring to one of the clutch members and thereby cause it to engage with the other clutch member when the speed of the driving clutch member reaches or exceeds a predetermined limit.

3. In a friction clutch mechanism the combination of driving and driven clutch members, a spring which tends to move one clutch member into and maintain it in engagement with the other clutch member, a thrust member which can take the load of the spring, a governor, means controlled by the governor for moving the thrust member so as to transfer the load of the spring to one of the clutch members and thereby cause it to engage with the other clutch member when the speed of the driving clutch member reaches or exceeds a predetermined limit, and means for effecting the engagement or disengagement of the clutch members irrespective of the action of the governor controlled means.

4. In a friction clutch mechanism the combination of driving and driven clutch members, a spring which tends to move the driven clutch member into and maintain it in engagement with the driving clutch member, a thrust member adapted to take the load of the spring, a centrifugal governor mounted on the driving clutch member, means operated by the governor for moving the thrust member so as to transfer the load of the spring to the driven clutch member and thereby cause the engagement of the clutch when the speed of the driving clutch member reaches or exceeds a predetermined limit, and means for effecting the engagement or disengagement of the clutch members irrespective of the action of the governor controlled means.

5. In a friction clutch mechanism the combination of driving and driven clutch members, a spring which tends to move one clutch member into and maintain it in engagement with the other clutch member, a thrust member which can take the load of the spring, a governor, means controlled by the governor for moving the thrust member so as to transfer the load of the spring to one of the clutch members and thereby cause it to engage with the other clutch member when the speed of the driving clutch member reaches or exceeds a predetermined limit, and means for automatically disengaging the clutch members if and when the driven clutch member tends to overrun the driving clutch member.

6. In a friction clutch mechanism, the combination of driving and driven clutch members, a spring which tends to move the driven clutch member into and maintain it in engagement with the driving clutch member, a thrust member which can take the load of the spring, a centrifugal governor mounted on the driving clutch member, means operated by the governor for moving the thrust member so as to transfer the load of the spring to the driven clutch member and thereby cause the engagement of the clutch when the speed of the driving clutch member reaches or exceeds a predetermined limit, and means for automatically disengaging the clutch members if and when the driven clutch member tends to overrun the driving clutch member.

7. In a friction clutch mechanism the combination of driving and driven clutch members, a spring which tends to move one clutch member into and maintain it in engagement with the other clutch member, a thrust member which can take the load of the spring, a governor, means controlled by the governor for moving the thrust member so as to transfer the load of the spring to one of the clutch members and thereby cause it to engage with the other clutch member when the speed of the driving clutch member reaches or exceeds a predetermined limit, means for effecting the engagement or disengagement of the clutch members irrespective of the action of the governor controlled means, and means for automatically disengaging the clutch members if and when the driven clutch member tends to overrun the driving clutch member.

8. In a friction clutch mechanism the combination of driving and driven clutch members, a spring which tends to move the driven clutch member into and maintain it in engagement with the driving clutch member, a thrust member adapted to take the load of the spring, a centrifugal governor mounted on the driving clutch member, means operated by the governor for moving the thrust member so as to transfer the load of the spring to the driven clutch member and thereby cause the engagement of the clutch when the speed of the driving clutch member reaches or exceeds a predetermined limit, means for effecting the engagement or disengagement of the clutch members irrespective of the action of the governor controlled means, and means for automatically disengaging the clutch members if and when the driven clutch member tends to overrun the driving clutch member.

9. In a friction clutch mechanism, the combination of driving and driven clutch members, a sleeve mounted on and axially movable relatively to the driven clutch member, an annular thrust member mounted on and axially movable relatively to the sleeve, a spring surrounding the sleeve and held in compression between the clutch member which carries the sleeve and the thrust member, a stop on the sleeve adapted to limit the axial movement of the thrust member on the sleeve under the spring pressure, a part connected to the driven clutch member and disposed adjacent to the end of the sleeve and adapted to receive the load of the spring, and a centrifugal governor mounted on the driving clutch member and adapted to move the sleeve in an axial direction and thereby transfer the load of the spring on the thrust member from the sleeve stop to the driven clutch member so that the latter will tend to engage the driving clutch member when the speed of the driving shaft reaches or exceeds a predetermined limit.

10. In a friction clutch mechanism, the combination of driving and driven clutch members, a sleeve mounted on and axially movable relatively to the driven clutch member, an annular thrust member mounted on and axially movable relatively to the sleeve, a spring surrounding the sleeve and held in compression between the clutch member which carries the sleeve and the thrust member, a stop on the sleeve adapted to limit the axial movement of the thrust member on the sleeve under the spring pressure, a part connected to the driven clutch member and disposed adjacent to the end of the sleeve and adapted to receive the load of the spring, a centrifugal governor mounted on the driving clutch member and adapted to move the sleeve in an axial direction and thereby transfer the load of the spring on the thrust member from the sleeve stop to the driven clutch member so that the latter will tend to engage the driving clutch member when the speed of the driving shaft reaches or exceeds a predetermined limit, and means for effecting the engagement and disengagement of the clutch members irrespective of the action of the governor controlled means.

11. In a friction clutch mechanism, the combination of driving and driven clutch members, a sleeve mounted on and axially movable relatively to the driven clutch member, an annular thrust member mounted on and axially movable relatively to the sleeve, a spring surrounding the sleeve and held in compression between the clutch member which carries the sleeve and the thrust member, a stop on the sleeve adapted to limit the axial movement of the thrust member on the sleeve under the spring pressure, a part connected to the driven clutch member and disposed adjacent to the end of the sleeve and adapted to receive the load of the spring, a centrifugal governor mounted on the driving clutch member and adapted to move the sleeve in an axial direction and thereby transfer the load of the spring on the thrust member from the sleeve stop to the driven clutch member so that the latter will tend to engage the driving clutch member when the speed of the driving shaft reaches or exceeds a predetermined limit, and means for automatically disengaging the clutch members if and when the driven clutch member tends to overrun the driving clutch member.

In testimony whereof I have signed my name to this specification.

ALEXANDER GEORGE IONIDES.